United States Patent
Scheller et al.

(10) Patent No.: US 7,080,890 B2
(45) Date of Patent: Jul. 25, 2006

(54) METHOD FOR IMPROVING THE OPERATION OF A BRAKING SYSTEM

(75) Inventors: Tobias Scheller, Frankfurt am Main (DE); Ralf Reviol, Dietzenbach-Steinberg (DE); Ralph Gronau, Wetter (DE); Andreas Neu, Kuhardt (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 0 days.

(21) Appl. No.: 10/503,677

(22) PCT Filed: Dec. 3, 2002

(86) PCT No.: PCT/EP02/13641

§ 371 (c)(1),
(2), (4) Date: Aug. 2, 2004

(87) PCT Pub. No.: WO03/066404

PCT Pub. Date: Aug. 14, 2003

(65) Prior Publication Data

US 2005/0168061 A1 Aug. 4, 2005

(30) Foreign Application Priority Data

Feb. 7, 2002 (DE) ................. 102 05 173
Oct. 17, 2002 (DE) ................. 102 48 341

(51) Int. Cl.
*B60T 8/32* (2006.01)
(52) U.S. Cl. ...................... 303/3; 303/113.1
(58) Field of Classification Search ............... 303/3, 303/15, 20, 113.1–113.4; 361/154, 187; 701/66

See application file for complete search history.

(56) References Cited

U.S. PATENT DOCUMENTS

| | | | | |
|---|---|---|---|---|
| 5,934,767 A | * | 8/1999 | Schmidt et al. | 303/119.2 |
| 6,030,055 A | * | 2/2000 | Schubert | 303/113.4 |
| 6,033,035 A | * | 3/2000 | Neumann et al. | 303/113.4 |
| 6,086,167 A | * | 7/2000 | Heckmann et al. | 303/155 |
| 6,244,670 B1 | * | 6/2001 | Wagner et al. | 303/113.4 |
| 6,511,137 B1 | * | 1/2003 | Gerdes | 303/156 |
| 6,692,088 B1 | * | 2/2004 | Zheng | 303/113.1 |
| 6,805,415 B1 | * | 10/2004 | Isono et al. | 303/112.11 |
| 2001/0025750 A1 | * | 10/2001 | Oishi et al. | 188/151 R |
| 2003/0098613 A1 | * | 5/2003 | Bohm et al. | 303/166 |

(Continued)

FOREIGN PATENT DOCUMENTS

DE 195 41 381 A1 5/1997

(Continued)

OTHER PUBLICATIONS

German Search Report of Application No. 102 48 341.8 dated Jun. 25, 2003.

(Continued)

*Primary Examiner*—Chris Schwartz
(74) *Attorney, Agent, or Firm*—RatnerPrestia

(57) ABSTRACT

In a method for improving the operation of a hydraulic vehicle brake system with an active hydraulic brake boost, wherein a pressure fluid volume flow between a master brake cylinder and the wheel brakes of the vehicle is controlled by means of an analog or analogized separating valve, and wherein a hydraulic pressure is determined in the master brake cylinder, an increase of the hydraulic pressure in the master brake cylinder is monitored and/or controlled on the basis of the hydraulic pressure determined in the master brake cylinder in a transition of the separating valve from a closed switch position to an open switch position.

9 Claims, 2 Drawing Sheets

U.S. PATENT DOCUMENTS

| | | | |
|---|---|---|---|
| 2004/0041466 A1* | 3/2004 | Giers | 303/20 |
| 2004/0080208 A1* | 4/2004 | Giers et al. | 303/20 |
| 2004/0150262 A1* | 8/2004 | Gronau et al. | 303/191 |
| 2005/0082905 A1* | 4/2005 | Gronau et al. | 303/11 |

FOREIGN PATENT DOCUMENTS

| | | |
|---|---|---|
| DE | 199 63 760 A1 | 7/2001 |
| DE | 101 14 599 A1 | 12/2001 |
| EP | 0 110 119 A1 | 6/1984 |
| EP | 0 841 231 A2 | 5/1998 |
| EP | 0 928 730 A1 | 7/1999 |
| WO | WO 94/27848 | 12/1994 |
| WO | WO 00/10854 | 3/2000 |

OTHER PUBLICATIONS

International Search Report of International Application No. PCT/EP02/13641 dated Mar. 3, 2003.

Patent Abstract of Japanese Publication No. 10181575, publication date Jul. 7, 1998, Applicant: Denso Corp., Inventor: Yonemura Shuichi, Title: Brake Device for Vehicle.

* cited by examiner

METHOD FOR IMPROVING THE OPERATION OF A BRAKING SYSTEM

TECHNICAL FIELD

The present invention relates to a method for improving the operation of a hydraulic vehicle brake system with an active hydraulic brake boost, wherein a pressure fluid volume flow between a master brake cylinder and the wheel brakes of the vehicle is controlled by means of an analog or analogized separating valve, and wherein a hydraulic pressure is determined in the master brake cylinder.

BACKGROUND OF THE INVENTION

The vacuum supply for the vacuum brake booster is normally executed by means of a driving engine (internal combustion engine). If the maximum attainable boosting force is insufficient due to an only weak vacuum supply, which becomes more frequent in novel engine technology such as a direct gasoline injection system or Diesel engine, there is need for an additional brake boost.

One possibility of producing an additional brake force or an additional brake pressure involves the use of 'active' hydraulic brake boost. This is achieved e.g. by means of a hydraulic pump. The hydraulic pressure, which results in the hydraulic master brake cylinder from the brake force that is introduced by the driver by way of the brake pedal and boosted by means of a vacuum brake booster is additionally increased by the hydraulic pump. Said pump is driven by an electric motor actuated by an electronic brake control unit. An actuatable separating valve is arranged in a connecting line between the master brake cylinder and the wheel brakes for the purpose of regulating or controlling the brake pressure.

It is known in the art to configure these valves as analog or analogized valves, allowing the adjustment of intermediate positions in addition to an open and a closed switch position. It is thus possible to adjust a defined volume flow through these valves.

It is necessary in systems of this type to know about the valve characteristic curves of the separating valves because pedal comfort depends on this knowledge. If a stored characteristic curve is not in conformity with the actual characteristic curve, an excessively large valve opening may be produced in the transition from the closed valve to the partly open (analog) valve. From this results a too large volume flow through the valve what the driver can feel at the brake pedal. If a volume flow in the direction of the master brake cylinder is very large, a pressure rise in the master brake cylinder can even cause a wrong interpretation of the driver's request. Pressure build-up may then be unduly initiated. The driver registers this condition, too. He/she senses that the pedal moves away or is 'sucked away' due to the erroneously triggered pressure build-up. This situation can also occur several times during release of the brake pedal. The negative effect is particularly easy to recognize in these vibrating modulations because a first error control will also cause a subsequent error control.

BRIEF SUMMARY OF THE INVENTION

An object of the invention is to provide the method for the operation of a hydraulic vehicle braking system with an active hydraulic brake boost that allows avoiding the shortcomings of prior art systems and improving the brake pedal comfort for the driver.

According to the invention, this object is achieved by the features of the independent patent claim.

The sub claims indicate particularly favorable improvements and embodiments of the invention.

According to the invention it is arranged for that in a method for improving the operation of a hydraulic vehicle braking system with an active hydraulic brake boost, wherein a pressure fluid volume flow between a master brake cylinder and the wheel brakes of the vehicle is controlled by means of an analog or analogized separating valve, and wherein a hydraulic pressure in the master brake cylinder is determined, an increase of the hydraulic pressure in the master brake cylinder is monitored and/or controlled on the basis of the hydraulic pressure determined in the master brake cylinder in a transition of the separating valve from a pressure increase switch position, in particular a closed switch position, to a pressure reduction switch position, in particular an open switch position.

An analog or analogized valve can adopt all positions between OPEN and CLOSED by means of an electric or electronic independent actuation so that the braking pressure for control or comfort braking operations can be infinitely variably increased or reduced. Preferably, the analog or analogized valve is adjusted with a current value or a defined current strength.

It is preferred that the master brake cylinder has a dual-circuit design and, more particularly, is configured as a tandem master cylinder.

The hydraulic pressure in the master brake cylinder is favorably determined by means of a pressure transducer or pressure sensor in a hydraulic line between the master brake cylinder and the separating valve.

The invention arranges that the pressure rise is monitored and/or controlled on the basis of a substantially unfiltered value for the hydraulic pressure in the master brake cylinder.

A 'substantially unfiltered value for the hydraulic pressure' implies a measured pressure value, which was not retroactively corrected or weighted by evaluation of the pressure variation and/or the influence of other quantities.

Preferably, the hydraulic pressure in the master brake cylinder is determined directly after the transition from the closed switch position of the separating valve to the open switch position, and this first, substantially unfiltered value is stored.

It is arranged for that the transition from the closed switch position of the separating valve to the open switch position takes place according to a predetermined function being variable in accordance with a substantially unfiltered value for the hydraulic pressure in the master brake cylinder.

Further, it is arranged for that the predetermined function for the transition from the closed switch position of the separating valve to the open switch position is a jump function with an adjacent ramp, by means of which the current strength for actuation of the analog or analogized separating valve is controlled.

The invention provides that in the jump function with adjacent ramp, initially a holding current abruptly adjusts a current strength basic value lying in the range of the value to be adjusted, and that based on this current strength basic value, the current strength is led by way of a defined ramp to the current strength to be adjusted.

According to the invention, the current strength jump function is used to adjust a nominal pressure basic value which lies above the pressure to be actually adjusted, in particular in a range of 20 bar to 60 bar, preferably about 30 bar, above the pressure to be adjusted. To this end, the pressure is predefined as a nominal value in the control, and a current is adjusted in conformity with mostly stored valve characteristic curves which corresponds with the pressure to be adjusted, that means, the current is a function of the pressure (I=f(P) or, respectively, I=f(ΔP)). Thus, a demanded nominal pressure can be adjusted reliably even with different valve characteristic curves.

The invention provides that the hydraulic pressure in the master brake cylinder is determined directly after the transition from the closed switch position of the separating valve to the open switch position, and this first substantially unfiltered value is stored, and that the predetermined function for the transition from the closed switch position of the separating valve to the open switch position is changed when the current value of the substantially unfiltered value for the hydraulic pressure in the master brake cylinder exceeds the first, substantially unfiltered value by a predetermined limit value. In addition, the ramp is preferably retarded when the time derivative, that means the gradient, of the substantially unfiltered pressure exceeds the value zero (P-Main>0).

It is arranged for that a limit value is predetermined in a range of 0.1 to 2 bar, in particular roughly 0.5 bar.

According to the invention, it is provided that when the current value of the substantially unfiltered value for the hydraulic pressure in the master brake cylinder exceeds the first, substantially unfiltered value by a predetermined limit value, the current strength for the actuation of the analog or analogized separating valve is set to a modified current strength basic value or is gradually led to a modified current strength basic value which exceeds the current strength basic value, and then the current strength is led by way of a defined ramp to the current strength to be adjusted, based on this modified current strength basic value.

It is provided that the modified current strength basic value is used to adjust a modified basic pressure value (ΔP+ΔPadd) that is by approximately 20 bar (=ΔPadd) higher than the basic value of the nominal pressure. Subsequently, the current strength is adjusted accordingly (I=f (ΔP+≠Padd)).

DETAILED DESCRIPTION OF THE PREFERRED EMBODIMENTS

Figure 1:
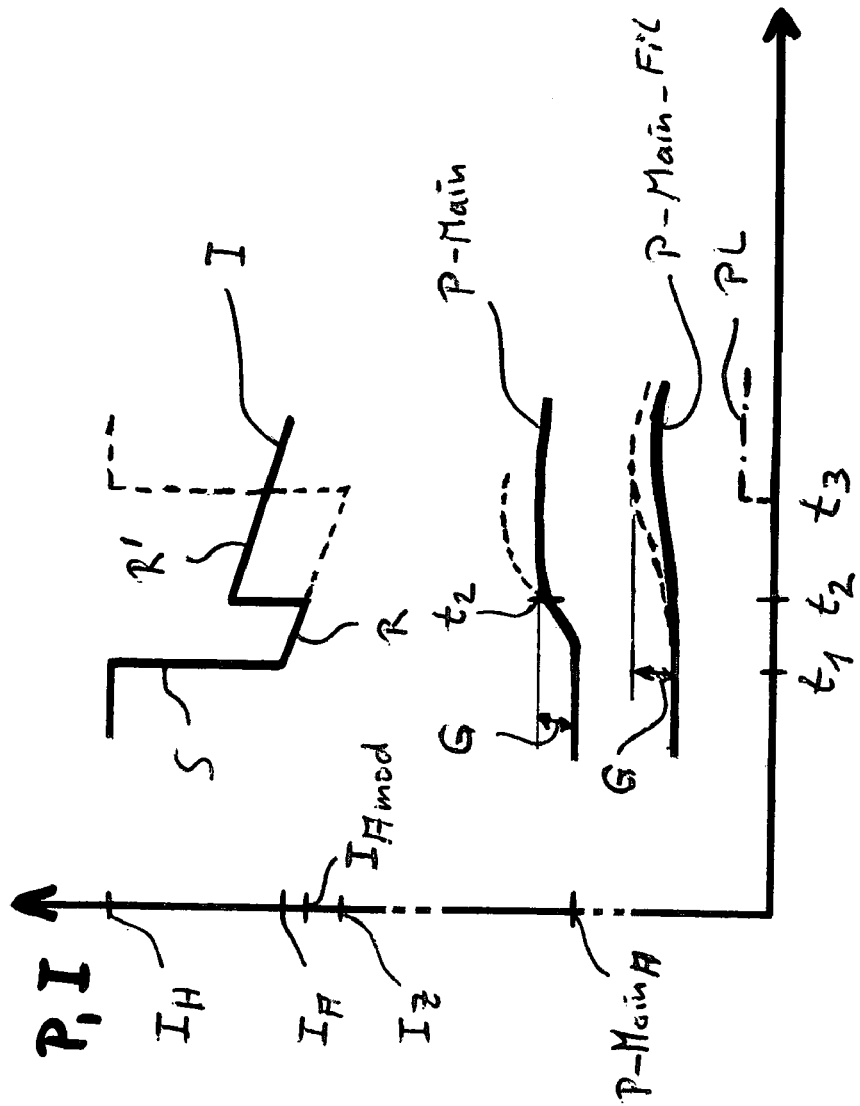
FIG. 1 shows schematic views of the variation of the hydraulic pressure P, in particular a substantially unfiltered pressure P-Main and a filtered pressure P-Main_Fil as well as corresponding values for the current strength I for controlling a separating valve as a function of time t.
Figure 2:
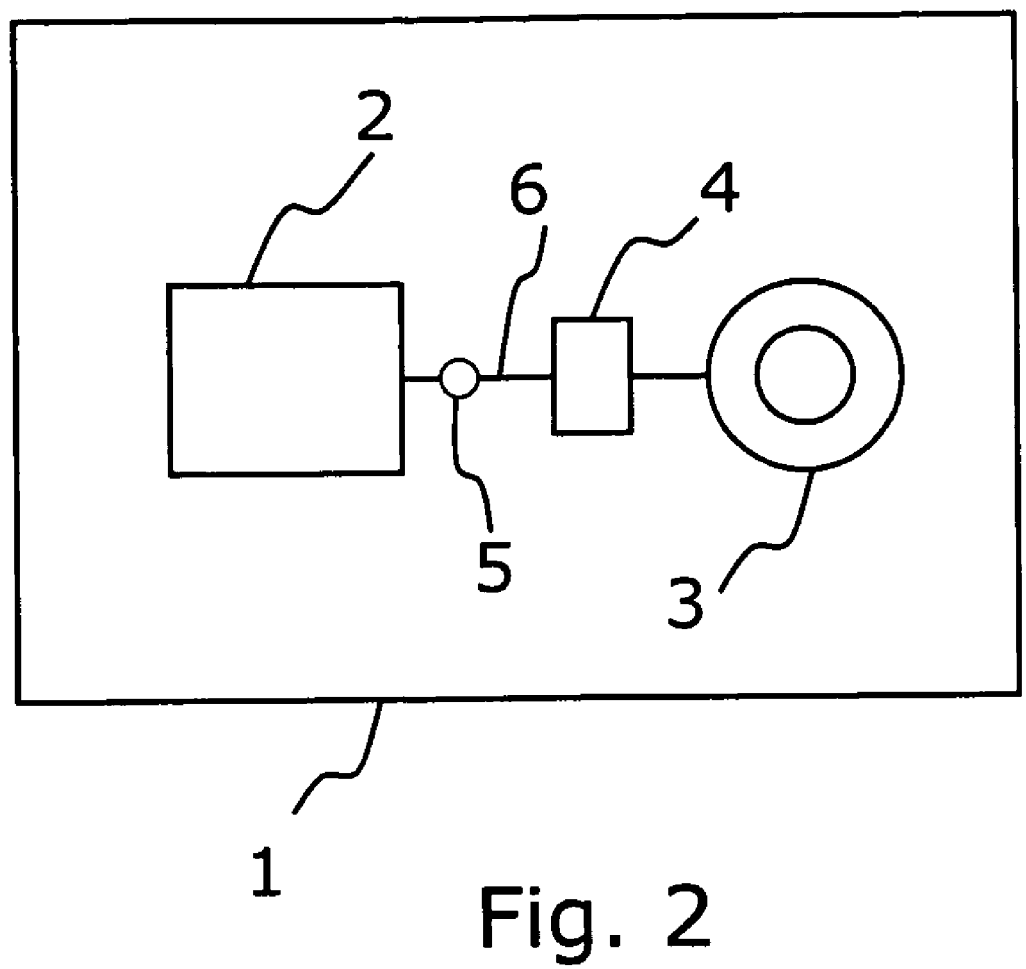
FIG. 2 shows a schematic view of the hydraulic vehicle brake system in accordance with an embodiment of the invention.

Referring to FIGS. 1 and 2, according to the invention it is arranged for that in a method for improving the operation of a hydraulic vehicle braking system with an active hydraulic brake boost 1, wherein a pressure fluid volume flow between a master brake cylinder 2 and the wheel brakes 3 of the vehicle is controlled by means of an analog or analogized separating valve 4, and wherein a hydraulic pressure in the master brake cylinder is determined, an increase of the hydraulic pressure in the master brake cylinder is monitored and/or controlled on the basis of the hydraulic pressure determined in the master brake cylinder in a transition of the separating valve from a pressure increase switch position, in particular a closed switch position, to a pressure reduction switch position, in particular an open switch position.

An analog or analogized valve 4 can adopt all positions between OPEN and CLOSED by means of an electric or electronic independent actuation so that the braking pressure for control or comfort braking operations can be infinitely variably increased or reduced. Preferably, the analog or analogized valve 4 is adjusted with a current value or a defined current strength.

It is preferred that the master brake cylinder 2 has a dual-circuit design and, more particularly, is configured as a tandem master cylinder.

The hydraulic pressure in the master brake cylinder 2 is favorably determined by means of a pressure transducer or pressure sensor 5 in a hydraulic line 6 between the master brake cylinder 2 and the separating valve 4.

According to the invention, the substantially unfiltered tandem master cylinder pressure (P-MAIN) is used for monitoring the system behavior in the transition from a holding phase with a holding current $I_H$ (closed valve) to the pressure reduction. Monitoring the substantially unfiltered tandem master cylinder pressure P-MAIN is advantageous in that a pressure rise can be detected before the filtered tandem master cylinder pressure (P-MAIN) which is taken into account for the build-up calculation reaches corresponding threshold values that initiate an unjustified build-up.

As soon as the pressure holding phase with the holding current $I_H$ is left and a jump is made (jump S in FIG. 1) to a pressure or a current (current strength basic value $I_A$) which particularly lies approximately 60 bar above the value to be adjusted, the monitoring and controlling of the hydraulic pressure in the master brake cylinder 2 (solid curves in FIG. 1) according to the invention starts at time $t_1$.

While the pressure corresponding to the current is led by way of a defined ramp R to the target value that corresponds to the current $I_Z$, the substantially unfiltered tandem master cylinder pressure P-MAIN that is measured at the start of the ramp P-MAIN$_A$ is stored. When the substantially unfiltered tandem master cylinder pressure P-MAIN rises within the current ramp R by a value that is higher than a limit value G, e.g. is higher than 0.5 bar (time $t_2$), then the declining pressure ramp or corresponding R current ramp is terminated.

The pressure is set by the current I to a modified basic pressure value by way of the modified current strength basic value $I_{Amod}$ or gradually led thereto, which value lies above the basic value of the nominal pressure or the current strength basic value $I_A$ which was adjusted at the beginning of the ramp R. Commencing this point of time, the normal pressure control by way of the current control with a ramp R' is admitted again.

It is arranged for that the ramp R' is variable in relation to the ramp R. Preferably, the inclination of the ramp is modified as a function of the time in which the limit value G was reached or exceeded.

The variation of the filtered pressure P-Main_Fil is also illustrated in the Figure. It can be seen from the Figure that the filtered pressure variation does not represent the quick pressure rise due to the valve actuation.

The dotted lines in the Figure also depict the variations for the situation when the method of the invention is not implemented. In this case, the pressures P-Main and P-Main_Fil are highly raised. However, when looking at P-Main_Fil, the limit value G is not exceeded until a later time $t_3$. A hydraulic pump is actuated (pump operation PL) reducing the hydraulic pressure in the master brake cylinder.

The driver will notice this fact because the brake pedal moves away, is 'sucked away'.

It is also arranged for to apply the method of the invention irrespective of the reason for the pressure rise P-MAIN. A pressure rise executed by the driver can also justify a control according to the invention. An improved detection of the driver's request is also given due to the quick termination of the unduly high pressure reduction, because the superposition of the substantially unfiltered tandem master cylinder pressure P-MAIN and the filtered tandem master cylinder pressure P-MAIN_FIL (see Figure) is reduced.

The invention claimed is:

1. Method for improving the operation of a hydraulic vehicle brake system having an active hydraulic brake boost, wherein a pressure fluid volume flow between a master brake cylinder and the wheel brakes of the vehicle is controlled by means of an analog or analogized separating valve variable between a pressure increase position and a pressure reduction position, the method comprising:
    determining an initial substantially unfiltered value for the hydraulic pressure in the master brake cylinder;
    monitoring the substantially unfiltered value for the hydraulic pressure in the master brake cylinder during a valve transition from the pressure increase position to the pressure reduction position; and
    controlling the valve position according to a predetermined function which is variable based on the relationship between the monitored substantially unfiltered value of the hydraulic pressure in the master brake cylinder and the initial substantially unfiltered value of the hydraulic pressure in the master brake cylinder and wherein the predetermined function includes a jump function and an adjacent ramp function by means of which a current strength for actuation of the analog or analogized separating valve is controlled.

2. Method as claimed in claim 1 wherein the initial substantially unfiltered value for the hydraulic pressure in the master brake cylinder is determined directly after the transition from the valve pressure increase position toward the valve pressure reduction position.

3. Method as claimed in claim 1 wherein the predetermined function further includes an initial holding current strength and wherein the jump function abruptly adjusts the current strength to a basic current strength distinct from a target adjusted current strength, and wherein the ramp function is configured to adjust to the current strength more gradually from the basic current strength toward the target adjusted current strength.

4. Method as claimed in claim 3 wherein the basic current strength lies above the target adjusted current strength.

5. Method for improving the operation of a hydraulic vehicle brake system having an active hydraulic brake boost, wherein a pressure fluid volume flow between a master brake cylinder and the wheel brakes of the vehicle is controlled by means of an analog or analogized separating valve variable between a pressure increase position and a pressure reduction position, the method comprising:
    determining an initial substantially unfiltered value for the hydraulic pressure in the master brake cylinder;
    monitoring the substantially unfiltered value for the hydraulic pressure in the master brake cylinder during a valve transition from the pressure increase position to the pressure reduction position; and
    controlling the valve position according to a predetermined function which is variable based on the relationship between the monitored substantially unfiltered value of the hydraulic pressure in the master brake cylinder and the initial substantially unfiltered value of the hydraulic pressure in the master brake cylinder and wherein the predetermined function includes a jump function and an adjacent ramp function by means of which a current strength for actuation of the analog or analogized separating valve is controlled;
    And wherein the initial substantially unfiltered value for the hydraulic pressure in the master brake cylinder is determined directly after the transition from the valve pressure increase position toward the valve pressure reduction position; and
    wherein the predetermined function is changed when the monitored substantially unfiltered value of the hydraulic pressure in the master brake cylinder exceeds the initial substantially unfiltered value of the hydraulic pressure in the master brake cylinder by a predetermined limit value.

6. Method as claimed in claim 5 wherein change in the predetermined function includes terminating the ramp function is terminated when a time derivative for the monitored substantially unfiltered value of the hydraulic pressure in the master brake cylinder exceeds zero.

7. Method as claimed in claim 5 wherein the predetermined limit value is in a range of 0.1 to 2 bar.

8. Method as claimed in claim 5 wherein the predetermined function the jump function abruptly adjusts the current strength to a basic current strength distinct from a target adjusted current strength, and wherein the ramp function is configured to adjust to the current strength more gradually from the basic current strength toward the target adjusted current strength and wherein change in the predetermined function includes setting the current strength to a modified basic current strength or gradually leading the current strength to the modified basic current strength, the modified basic current strength exceeding the basic current strength, and then leading the current strength by way of a second defined ramp function toward a second target adjusted current strength based on the modified basic current strength basic.

9. Method as claimed in claim 8 wherein the modified basic current strength is used to adjust a modified basic pressure value that is by approximately 20 bar higher than a nominal pressure basic value.

* * * * *